United States Patent Office 2,814,620
Patented Nov. 26, 1957

2,814,620

CELLULOSE ETHER PROCESSING

William D. Stewart, Falls Church, Va., and William L. Wachtel, Washington, D. C., assignors to Atlantic Research Corporation, Alexandria, Va., a corporation of Virginia No Drawing. Application February 24, 1955,
Serial No. 490,432

23 Claims. (Cl. 260—232)

This invention relates to a new and improved process for making small, dense, substantially spherical particles of water-insoluble cellulose ethers.

Methods for making spherical particles of cellulose ethers are described in co-pending application of Arthur W. Sloan, Serial Number 479,640, filed January 3, 1955. The process described herein possesses the advantages, as compared with the Sloan and Mann processes, of greater simplicity, reduced cost and the elimination of the numerous washings of the particles required to remove the coating of protective colloid.

The object of this invention is to provide a process for making small, dense, substantially spherical particles of water-insoluble cellulose ethers which requires the addition of a minimum of readily removable treating agent.

Other objects and advantages will become obvious from the following detailed description.

Broadly, the invention comprises dissolving the cellulose ether in a suitable solvent to form a lacquer, dispersing the lacquer in an aqueous vehicle in the presence of a suitable emulsifying agent under vigorous agitation, removing the solvent from the dispersed cellulose ether particles while suspended in the water, washing and drying the particles.

Any suitable, water-insoluble cellulose ether such as an alkyl ether or hydroxyalkyl ether as, for example, ethyl cellulose, butyl cellulose or hydroxyethyl cellulose may be treated according to our process.

To obtain particles of the desired size, sphericity and density, the components and conditions of the process must be carefully controlled.

The cellulose ether solvent may be a single solvent which is insoluble to moderately solube in water or a mixture of solvents, at least one component of which is insoluble to moderately soluble in water and another component of which may be infinitely soluble in water. Whether a single or mixed solvent is employed for the cellulose ether, maximum solubility of the organic solvent must be about 50 to 60, preferably about 40, parts in 100 parts of water at 20° C. The amount of infinitely soluble component in a mixed solvent must not exceed such proportions as to raise total solubility of the mixed solvent above the 60% maximum. By "moderately soluble" is meant an organic solvent having a solubility of about 5 to 30 parts per 100 parts of water at 20° C. In general, for optimum performance, it is preferable that the cellulose ether solvent, whether single or mixed have a minimum solubility of about 5 parts per 100 parts of water.

Insoluble to moderately soluble solvents which may be employed include, for example, benzene, toluene, methyl aceate, ethyl acetate, methyl formate, ethyl formate, diethyl ether, methyl ethyl ketone, methylene chloride, ethylene dichloride, chloroform and the like.

Infinitely water-soluble co-solvents include the lower aliphatic alcohols such as methyl, ethyl and propyl alcohols, acetone, methyl lactate, ethyl lactate and dioxan-1,4.

Where co-solvent mixtures are used, it is not essential that each of the co-solvent components be a good solvent for the cellulose ether so long as they possess good solvent properties when in admixture. The lower aliphatic alcohols, for example, though poor solvents for ethyl cellulose per se, possess excellent co-solvent properties. It is desirable that the infinitely soluble component of a mixed cellulose ether solvent possess the ability to reduce viscosity of the lacquer. Methanol, ethanol and acetone are particularly effective in this regard.

Where a mixed cellulose ether solvent as, for example, one containing an infinitely soluble component, is employed, the ratio of components for optimum performance can readily be determined by routine experimentation. In most cases, a ratio of water-insoluble or moderately soluble component to infinitely soluble component of 80:20 to 85:15 by volume is particularly good. However, this may be varied so long as total solubility of the mixed solvent does not become excessive. We have found that where water-solubility of the cellulose ether solvent is higher than about 50 to 60%, the particles tend to become irregular and porous. Apparently elution of solvent becomes so rapid that the surface sets into a hard, non-plastic condition before surface tension forces can effectively shape the particles into the desired spherical form. Premature excessive hardening of the particle surface also causes porosity since the non-plastic surface does not permit adequate shrinkage to compensate for removal of solvent from the interior of the particle. With a cellulose ether solvent of excessive water-solubility, porosity may also be caused by migration of water into the particle because of the mutual solubility of water and a highly water-soluble solvent.

Choice of the particular solvent to be employed is determined to some extent by the method used in removing the solvent after particle formation. If the organic solvent is to be removed by distillation, it is desirable that the solvent have a relatively low boiling point. If elution is employed the solvent should be moderately soluble in water and, if a mixed solvent is used, the least soluble component should be moderately water-soluble.

We have found that to obtain spheres of the desired small size, concentration of the cellulose ether in the lacquer should not exceed about 20% by weight. Optimum concentration is about 7.5 to 15%. Lacquers containing more than about 20% cellulose ether are highly viscous, are comminuted with difficulty and tend to produce particles of generally excessive size. There is no critical lower limit of cellulose ether concentration in the lacquer other than that dictated by economic expediency. Good results are obtainable, for example, with concentrations as low as 2%. This, however, requires the use of large amounts of solvent and large operating equipment relative to the amount of cellulose ether processed.

The cellulose ether lacquer is mixed with water in the presence of a suitable emulsifying agent under continuous, vigorous agitation to form a dispersion of small lacquer particles with the water as the continuous phase. The emulsifying agent may be introduced into the lacquer or into the water prior to mixing or may be added to the lacquer-water mix. The dispersion and agitation may be accomplished by any suitable means, as for example, in a homogenizer or other suitable agitating device. The degree of agitation is one of the factors influencing particle size. In general, the more vigorous the agitation, the smaller are the particles.

The emulsifying agent is essential since it makes possible the fine comminution of the suspended particles and stabilizes the emulsion so that the surface of the particles have an opportunity to harden into a substantially non-tacky condition before agglomeration can occur. The emulsifying agent must be of the polar type which does not increase the viscosity of the water phase to any substantial degree and which functions primarily as a surface tension depressant as compared with the high molecular weight materials which function primarily as protective colloids. The emulsifying agent, furthermore, should be substantially water-soluble or, in other words, should possess a sufficiently high hydrophile-lipophile balance to prevent its being drawn into the organic solvent and converting the emulsion into a water-in-oil type system.

Examples of suitable polar-type emulsifiers or dispersing agents include alkyl sulfates or sulfonates, alkyl aryl sulfonates, alkali metal soaps, alkali metal and ammonium salts of perfluoro acids, alkali metal salts of sulfosuccinic acids, polyglycols such as polyethylene glycol, sulfonated vegetable oils such as sulfonated castor oil and sulfonated coconut oil, sulfonated hydrocarbon oils such as sulfonated petroleum fractions, and the like. The sulfonated oils such as Turkey red oil and sulfonated petroleum oils are particularly satisfactory either alone or combined with other surface-active agents such as the highly active wetting agents. However, any compatible surface-active emulsifying agent may be employed to give satisfactory results.

The amount of emulsifier varies to some extent with the activity of the specific one used and with the particular solvent used in making the cellulose ether lacquer. The amount used should be sufficient to permit rapid comminution of the particles and the formation of the emulsion before excessive surface hardening of the particles into irregular shapes. Amounts comprising about 0.1 to 0.2% based on the water phase are generally adequate although this may vary, as aforementioned, depending upon specific circumstances. There is no critical upper limit with regard to the amount of emulsifying agent other than the fact that, in general, no advantage is obtained with amounts exceeding about 5 to 10% on the aqueous phase to warrant the increased cost.

The amount of water employed in dispersing the cellulose ether lacquer is an important factor in determining particle size. Particle size is a function of the lacquer/water ratio in as much as increasing the amount of water increases particle size. Thus the quantity of water used in emulsification is determined in some measure by the particle size desired. The minimum amount of water is governed by the lacquer/water ratio required to permit formation of the requisite oil-in-water type emulsion. If excessive water is employed, the particles become oversize and may also become irregular and porous. In general, the maximum amount of water which gives satisfactory results in terms of desired particle characteristics is about 150% by volume based on the volume of organic solvent and preferably about 50 to 100%.

After emulsification of the lacquer is completed, the organic solvent must be removed from the dispersed lacquer particles. This may be accomplished by either of two methods. The solvent may be distilled off or eluted by dilution of the emulsion with additional water. During either process the dispersion should be maintained in a state of vigorous agitation.

Where distillation is employed, the temperature should be maintained below the boiling point of water, desirably at a maximum of about 85–90° C. and preferably about 65° C., since higher temperatures tend to break the emulsion, thus causing agglomeration and consequent particle irregularity and oversize. Excessively high temperatures also cause removal of the solvent from the surface of the particles at such a rapid rate that the surface sets and hardens to the point where surface plasticity is insufficient to compensate by contraction for removal of interior solvent and thus results in a porous particle. Where the organic solvent or its water azeotrope boils at relatively low temperatures, e. g. below about 85° C., temperatures may be raised to the boiling point of the solvent or azeotrope. In many cases, it may be advisable to distil under reduced pressure.

An alternative method for removing the organic solvent comprises dissolving it out by dilution of the emulsion with added water. The amount of water added to the emulsion for elution purposes should be in sufficient amount to permit aqueous solution of substantially all of the organic solvent contained in the cellulose ether particles. This to a considerable degree is determined by the solvent/water ratio in the original emulsion and the water-solubility of the specific organic solvent.

After removal of the organic solvent, the particles are separated from the emulsion in any desired manner as by filtration, centrifuging and the like. The particles are then washed and dried. One washing is generally sufficient to remove the emulsifying agent from the surface of the particles.

The cellulose ether particles prepared according to our process are substantially spherical. In other words, they are true spheres or closely approximate spheres such as spheroids. The particles can be obtained is sizes as small as 1 micron or less in diameter. The particles' size generally ranges up to about 10 or 30 microns. This is the preferred size range. Depending upon the degree of agitation, the specific components and concentrations employed in the process, particle size may range up to about 100 microns. In general, products in which the average particle diameter is above about 50 microns are marginal. In other words, it is preferable that the size distribution of the particles by number be such that the maximum average diameter is about 50 microns. Since all of the particles in a given production batch are obtainable in the desired small size range, there is no necessity for fractional screening or reworking of excessively large particles.

Density of the cellulose ether spheres is high. Average density of our ethyl cellulose product, for example, is about 1.13 to 1.14 with a minimum of about 1.1 as compared with published figures for ethyl cellulose of 1.07 to 1.18. The densities of the products prepared according to our process clearly demonstrate the substantial non-porosity of the particles.

The small, substantially non-porous, substantially spherical particles of cellulose ether may be employed in the manufacture of plastic objects and materials in any desired manner. They are especially useful, however, in that they can be suspended in a plasticizer to form homogeneous, stable, fluid suspensions which may be poured as coatings or films without requiring the addition of water or a volatile solvent and may be molded into objects of any desired shape and size without the application of high temperatures and pressures.

*Example I*

Sixty grams of ethyl cellulose (44.5–45.5% ethoxyl) were dissolved in 600 ml. of ethylene dichloride. The lacquer was dispersed by vigorous agitation with a dispersator in 450 ml. of water containing 4.8 grams of Turkey red oil as the emulsifying agent. Agitation was continued and the ethylene dichloride was removed from the dispersed lacquer particles by distillation at 15–35° C. and a pressure of 6 cm. The particles were filtered, washed once with water and dried. The resulting ethyl cellulose particles were 1–15 micron spheres.

Example II

Twenty grams of ethyl cellulose (44.5–45.5% ethoxyl) were dissolved in 200 ml. of ethyl acetate. The lacquer was dispersed by vigorous agitation in a blender in 150 ml. of water containing 1.6 grams of turkey red oil as the emulsifying agent. Agitation was continued for about five minutes and then the emulsion was diluted in about 4 liters of water with continued agitation to elute the organic solvent from the dispersed lacquer particles. The particles were filtered, given one washing with water and dried. The resulting ethyl cellulose particles were 1–15 micron spheres.

Example III

Forty-five grams of ethyl cellulose (47.5–49.0% ethoxyl) were dissolved in 450 ml. of benzene. The lacquer was dispersed by vigorous agitation with a dispersator in 335 ml. of water containing 3.6 grams of turkey red oil as the emulsifying agent. Agitation was continued and the benzene was removed from the dispersed lacquer particles by distillation at 19–45° C. under reduced pressure. The particles were filtered, water-washed once and dried. Resulting particles were 1–25 micron spheres.

Example IV

Twenty grams of ethyl cellulose (44.5–45.5% ethoxyl) were dissolved in 200 ml. of 80:20 ethyl acetate:ethanol. The lacquer was dispersed by vigorous agitation in 200 ml. of water containing 1.6 grams of turkey red oil as the emulsifying agent. Agitation was continued and the solvent was removed from the dispersed lacquer particles by the flooding with water. The particles were filtered, washed once with water and dried. The resulting particles of ethyl cellulose were 1–60 micron spheres.

Although this invention has been described with reference to illustrative embodiments thereof, it will be apparent to those skilled in the art that it may be embodied in other forms but within the scope of the appended claims.

We claim:

1. A process for making small, substantially non-porous, substantially spherical particles of water-insoluble cellulose ether selected from the group consisting of alkyl cellulose and hydroxyalkyl cellulose, which comprises dissolving up to about 20% of the cellulose ether in an organic solvent having a minimum solubility of about 60 parts per 100 parts of water at 20° C., dispersing the cellulose ether solution in water in the presence of a surface-active-polar emulsifying agent which is preferentially soluble in the water, and which does not increase substantially the viscosity of the water phase; the water being present in amount sufficient to form an oil-in-water emulsion and up to about 150% by volume based on the organic solvent, removing the organic solvent from the dispersed cellulose ether particles, the temperature of the emulsion during substantial solvent removal being up to the boiling point of the solvent but below the boiling point of water, and separating the particles from the water.

2. The process of claim 1 in which the temperature of the emulsion during substantial solvent removal is up to the boiling point of the solvent at the given pressure but not above about 65° C.

3. The process of claim 1 in which the cellulose ether is an alkyl cellulose.

4. The process of claim 1 in which the cellulose ether is ethyl cellulose.

5. The process of claim 2 in which the cellulose ether is ethyl cellulose.

6. The process of claim 5 in which maximum water solubility of the organic cellulose ether solvent is about 40 parts per 100 parts of water at 20° C. and the maximum concentration of the cellulose ether in the organic solvent is about 15%.

7. The process of claim 6 in which the amount of water is about 50 to 100% by weight based on the organic solvent.

8. The process of claim 1 in which the cellulose ether is ethyl cellulose and maximum solubility of the organic solvent is about 40 parts per 100 parts of water at 20° C.

9. The process of claim 8 in which the organic solvent comprises at least two components, the maximum solubility of one of said components being about 30 parts per 100 parts of water at 20° C. and another of said components being infinitely soluble.

10. The process of claim 9 in which the infinitely soluble component is selected from the group consisting of methanol, ethanol and acetone.

11. The process of claim 5 in which the emulsifying agent is a sulfonated oil.

12. The process of claim 2 in which the cellulose ether is alkyl cellulose.

13. The process of claim 1 in which the cellulose ether is lower-alkyl cellulose.

14. The process of claim 2 in which the cellulose ether is lower-alkyl cellulose.

15. A process for making small, substantially non-porous, substantially spherical particles of ethyl cellulose which comprises dissolving up to about 20% of ethyl cellulose in ethylene dichloride, dispersing the ethyl cellulose solution in water in the presence of a surface-active-polar emulsifying agent which is preferentially soluble in the water, and which does not increase substantially the viscosity of the water phase, the water being present in amount comprising about 50 to 150% by volume based on the organic solvent, removing the organic solvent from the dispersed ethyl cellulose particles, the temperature of the emulsion during substantial solvent removal being up to the boiling point of the organic solvent at the given pressure, and separating the particles from the water.

16. A process for making small, substantially non-porous, substantially spherical particles of ethyl cellulose which comprises dissolving up to about 20% of ethyl cellulose in ethyl acetate, dispersing the ethyl cellulose solution in water in the presence of a surface-active-polar emulsifying agent which is preferentially soluble in the water, and which does not increase substantially the viscosity of the water phase, the water being present in amount comprising about 50 to 150% by volume based on the organic solvent, removing the organic solvent from the dispersed ethyl cellulose particles, the temperature of the emulsion during substantial solvent removal being up to the boiling point of the organic solvent at the given pressure, and separating the particles from the water.

17. The process of claim 16 in which the organic solvent is removed from the dispersed ethyl cellulose particles by dilution of the emulsion with sufficient water to dissolve the organic solvent out of the dispersed ethyl cellulose particles.

18. A process for making small, substantially non-porous, substantially spherical particles of water-insoluble cellulose ether selected from the group consisting of alkyl cellulose and hydroxyalkyl cellulose, which comprises dissolving up to about 20% of the cellulose ether in an organic solvent which is moderately soluble in water to the extent of about 5 to 60 parts of water at 20° C., any component of said solvent having a water solubility of at least 5 parts, dispersing the cellulose ether solution in water in the presence of a surface-active, polar emulsifying agent which is preferentially soluble in the water and which does not increase substantially the viscosity of the water phase, the water being present in amount sufficient to form an oil-in-water emulsion and up to about 150% by volume based on the organic solvent, removing the organic solvent from the dispersed cellulose ether particles by diluting with sufficient water to dissolve the organic solvent out of the dispersed cellulose ether particles, and separating the particles from the water.

19. The process of claim 18 in which the cellulose ether is alkyl cellulose.

20. The process of claim 19 in which the alkyl cellulose is lower-alkyl cellulose.

21. The process of claim 20 in which the alkyl cellulose is ethyl cellulose.

22. The process of claim 21 in which the organic solvent comprises at least two components, one of said components being soluble in water to the extent of about 5 to 30 parts per 100 parts of water at 20° C. and another of said components being infinitely soluble in water.

23. The process of claim 21 in which the emulsifying agent is a sulfonated oil.

References Cited in the file of this patent

UNITED STATES PATENTS

| | | |
|---|---|---|
| 2,238,714 | Wells | Apr. 15, 1941 |
| 2,292,469 | Olsen | Aug. 11, 1942 |
| 2,722,528 | Johnson | Nov. 1, 1955 |
| 2,740,723 | Voris | Apr. 3, 1956 |

FOREIGN PATENTS

| | | |
|---|---|---|
| 285,829 | Great Britain | Dec. 6, 1928 |
| 589,984 | Great Britain | July 4, 1947 |